United States Patent
Kassiedass et al.

(10) Patent No.: US 8,698,597 B2
(45) Date of Patent: Apr. 15, 2014

(54) SYSTEM AND METHOD FOR ASSOCIATING AN ELECTRONIC DEVICE WITH A REMOTE DEVICE HAVING A VOICE INTERFACE

(75) Inventors: Sanathan Kassiedass, Waterloo (CA); Sean Taylor, Woodstock (CA)

(73) Assignee: BlackBerry Limited, Waterloo (CA)

( * ) Notice: Subject to any disclaimer, the term of this patent is extended or adjusted under 35 U.S.C. 154(b) by 923 days.

(21) Appl. No.: 12/147,907

(22) Filed: Jun. 27, 2008

(65) Prior Publication Data

US 2009/0322476 A1 Dec. 31, 2009

(51) Int. Cl.
*H04L 9/32* (2006.01)

(52) U.S. Cl.
USPC ............ 340/5.74; 340/5.8; 340/5.85; 340/5.6; 726/4; 455/411

(58) Field of Classification Search
USPC ........ 340/5.74, 5.8, 5.84, 5.85, 5.6; 455/41.2, 455/41.3, 410, 411; 726/2, 4–10
See application file for complete search history.

(56) References Cited

U.S. PATENT DOCUMENTS

| | | | |
|---|---|---|---|
| 6,772,331 B1 | 8/2004 | Hind et al. | |
| 7,254,367 B2 | 8/2007 | Helden et al. | |
| 7,474,888 B1 * | 1/2009 | Davis et al. | 455/411 |
| 2004/0107271 A1 * | 6/2004 | Ahn et al. | 709/219 |
| 2004/0137967 A1 * | 7/2004 | Bodley | 455/575.2 |
| 2006/0116107 A1 | 6/2006 | Hulvey | |
| 2006/0143455 A1 | 6/2006 | Gitzinger | |
| 2007/0226778 A1 * | 9/2007 | Pietruszka | 726/2 |
| 2008/0102793 A1 | 5/2008 | Ananthanarayanan et al. | |
| 2008/0113619 A1 | 5/2008 | Torrance et al. | |
| 2008/0134281 A1 * | 6/2008 | Shinde et al. | 726/1 |

FOREIGN PATENT DOCUMENTS

| | | |
|---|---|---|
| EP | 1710656 A1 | 10/2006 |
| EP | 1855177 A1 | 11/2007 |
| EP | 2001188 A1 | 12/2008 |

OTHER PUBLICATIONS

Gehrmann, C. Bluetooth Security White Paper. Bletooth SIG Security Expert Group. Apr. 14, 2002.
European Patent Office, Examination Report dated Aug. 12, 2013, issued in European Patent Application No. 08159296.
Rescorla Network Resonance E et al.: "A Survey of Authentication Mechanisms; draft-iab-auth-mech-05.txt", Feb. 1, 2006, No. 5, XP015043522, ISSN: 0000-0004.
"Bluetooth User Interface Flow Diagrams for Bluetooth Secure Simple Pairing Devices", Bluetooth.org—Bluetooth Secure Simple Pairing User Interface Flow Whitepaper, Sep. 13, 2007, http://bluetooth.org/Technical/Specifications/whitepapers.htm.

(Continued)

*Primary Examiner* — Mohammad Ghayour
*Assistant Examiner* — Nay Tun
(74) *Attorney, Agent, or Firm* — Norton Rose Fulbright Canada LLP (57) ABSTRACT

The disclosure provides a system and method for associating an electronic device with a remote electronic device. In the method at the remote device, an authentication process is initiated to authenticate the remote device to the electronic device. The authentication process includes: generating a pass key according to an authentication protocol followed by the remote device; and providing the pass key to a user through an output device on the remote device. The method also includes: waiting for the user to provide the pass key to the electronic device; and if the remote device receives a timely message from the electronic device indicating that the remote device has been authenticated, activating additional applications on the remote device to allow it to communicate with the electronic device.

16 Claims, 4 Drawing Sheets

(56) References Cited

OTHER PUBLICATIONS

Canadian Intellectual Property Office, Examination Report dated Mar. 1, 2012, issued in Canadian Patent Application No. 2,670,182.
McCarthy Tetrault LLP, Office Action Response dated Jun. 1, 2012, filed in Canadian Patent Application No. 2,670,182.
Canadian Intellectual Property Office, Examination Report dated Jan. 11, 2013, issued in Canadian Patent Application No. 2,670,182.
European Patent Office, Extended European Search Report dated Jan. 23, 2009, issued in European Patent Application No. 08159296.
Hanna Moore & Curley, Response to Extended European Search Report dated Jul. 19, 2010, filed in European Patent Application No. 08159296.
European Patent Office, Examination Report dated Jul. 11, 2011, issued in European Patent Application No. 08159296.
Hanna Moore & Curley, Response to Examination Report dated Oct. 24, 2011, filed in European Patent Application No. 08159296.

* cited by examiner

SYSTEM AND METHOD FOR ASSOCIATING AN ELECTRONIC DEVICE WITH A REMOTE DEVICE HAVING A VOICE INTERFACE

The disclosure describes a method and system of associating an electronic device from an accessory or an external device through remote signals, such as audible commands and signals. It relates to controlling a portable communication device through an associated headset, where access data relating to the device may be provided as a voice signal through the headset.

BACKGROUND

Portable handheld mobile communication devices provide wireless voice and data communications between the user of the device and other devices. Some communication devices allow voice-activated commands to be "spoken" into the device. Therein, an audible command is received by a microphone on the device and then software and firmware translates the command to an equivalent digital command that is then processed by the device. For example, if a device is in a "voice command" mode, and the user speaks a command phrase to its microphone, such as "call home", then the device will process the audible command, translate it into an internal command and process an outbound telephone call to a telephone number pre-programmed to be associated with "home". Other interfaces use Bluetooth (trade-mark) technologies to link a portable device to a voice-activated interface, such as a controlling a cellphone in a car through a voice-activated interface through a sound system of the car. These commands and interfaces do not provide additional security features or access to commands regarding the status of the device.

BRIEF DESCRIPTION OF THE DRAWINGS

Embodiments of the disclosure will now be described, by way of example only, with reference to the accompanying drawings, in which.

DETAILED DESCRIPTION OF AN EMBODIMENT

The description which follows and the embodiments described therein are provided by way of illustration of an example or examples of particular embodiments of the principles of the present disclosure. These examples are provided for the purposes of explanation and not limitation of those principles and of the disclosure. In the description which follows, like parts are marked throughout the specification and the drawings with the same respective reference numerals.

The disclosure outlines a method and apparatus to manipulate and control attachments remotely. It outlines a method to pass secure information (such as a pairing key) securely out-of-band from the normal data communication path. In an aspect, a user may vocalize a command into the headset, which processes the command and provides it to the device. Any response from the device may be transmitted to the headset.

In a first aspect, a method for associating a remote device with an electronic device is provided. In the method at the remote device, an authentication process is initiated to authenticate the remote device to the electronic device. The authentication process comprises: generating a pass key according to an authentication protocol followed by the remote device; and providing the pass key to a user through an output device on the remote device. The method also comprises: waiting for the user to provide the pass key to the electronic device; and if the remote device receives a timely message from the electronic device indicating that the remote device has been authenticated, activating additional applications on the remote device to allow it to communicate with the electronic device.

In the method, during the initiation of the authentication process, the remote device may: initially scan a database to identify a list of electronic devices with which it can communicate; provide a list of the electronic devices on a display of the remote device; prompt the user to identify a target electronic device of the electronic devices; and upon receiving an identification of the target electronic device from the user (such as through an appropriate reply signal provided to the remote device), initiate the authentication process for the target electronic device.

In the method, the remote device may provide a speaker and a microphone to provide audible communication with the user.

In the method, the remote device may generate an audio output on the speaker providing the pass key to the user.

The method may further comprise: receiving at the remote device vocalized information for the electronic device from the user through the microphone; processing the vocalized information to identify an underlying command for the electronic device; and generating a message to the electronic device relating to the underlying command.

In the method, the vocalized information may relate to data that is used by an application operating on the electronic device.

In the method, the remote device may provide the pass key to the user in an out-of-band transmission mode.

The method may further comprise if the remote device does not receive the timely message from the electronic device indicating that the remote device has been authenticated, not activating the additional applications on the remote device.

The method may further comprise generating data on the remote device and providing the data to the electronic device for use by an application operating on electronic device.

The method may further comprise at the remote device selectively tracking data associated with a voice communication session being handled by the electronic device.

In a second aspect a remote device that can be associated with an electronic device is provided. The remote device comprises: a speaker; a display; a microphone; an authentication process to authenticate the remote device to the electronic device. The authentication process generates a pass key according to an authentication protocol that is followed by the remote device. The remote device further includes a voice generation process to convert data relating to the pass key into a voice format for output on the speaker. If the remote device receives a timely message from the electronic device indicating that the remote device has been authenticated, the remote device is activated to allow it to communicate with the electronic device.

The remote device may further comprise: a database containing a list of electronic devices with which the remote device can communicate; and a device selection process operating on the remote device. The selection process may be enabled to: access the list; display aspect of the list on the display; prompt the user to identify a target electronic device of the electronic devices; and upon receiving an appropriate reply from the user, initiate the authentication process for the target electronic device.

The remote device may generate an audio output on the speaker providing the pass key to a user of the remote device.

The remote device may further comprise a voice processing application that: receives vocalized information for the device from the user through the microphone; processes the vocalized information to identify an underlying command for the device; and generates a message to the device relating to the underlying command.

In the remote device, the vocalized information may relate to data that is used by an application operating on the device.

The remote device may provide the pass key to the user in an out-of-band transmission mode.

In other aspects, various combinations of sets and subsets of the above aspects are provided.

Generally, an embodiment provides a system and method for interfacing/associating a remote accessory, such as a headset, to a (portable) electronic device, such as a portable communication device. The interface allows information to be provided from the headset to the user in an audible form, such as a computer-generated voice. Similarly, the user can issue voice commands to the headset that are destined for the device. The interface also can provide a secure-pair association of the headset to the device.

Exemplary details of embodiments are provided herein. First, a description is provided on general concepts and features of a communication device and an associated headset according to an embodiment. Then, further detail is provided on exemplary interfaces and commands that are used by the headset and the device in an embodiment.

Figure 1:
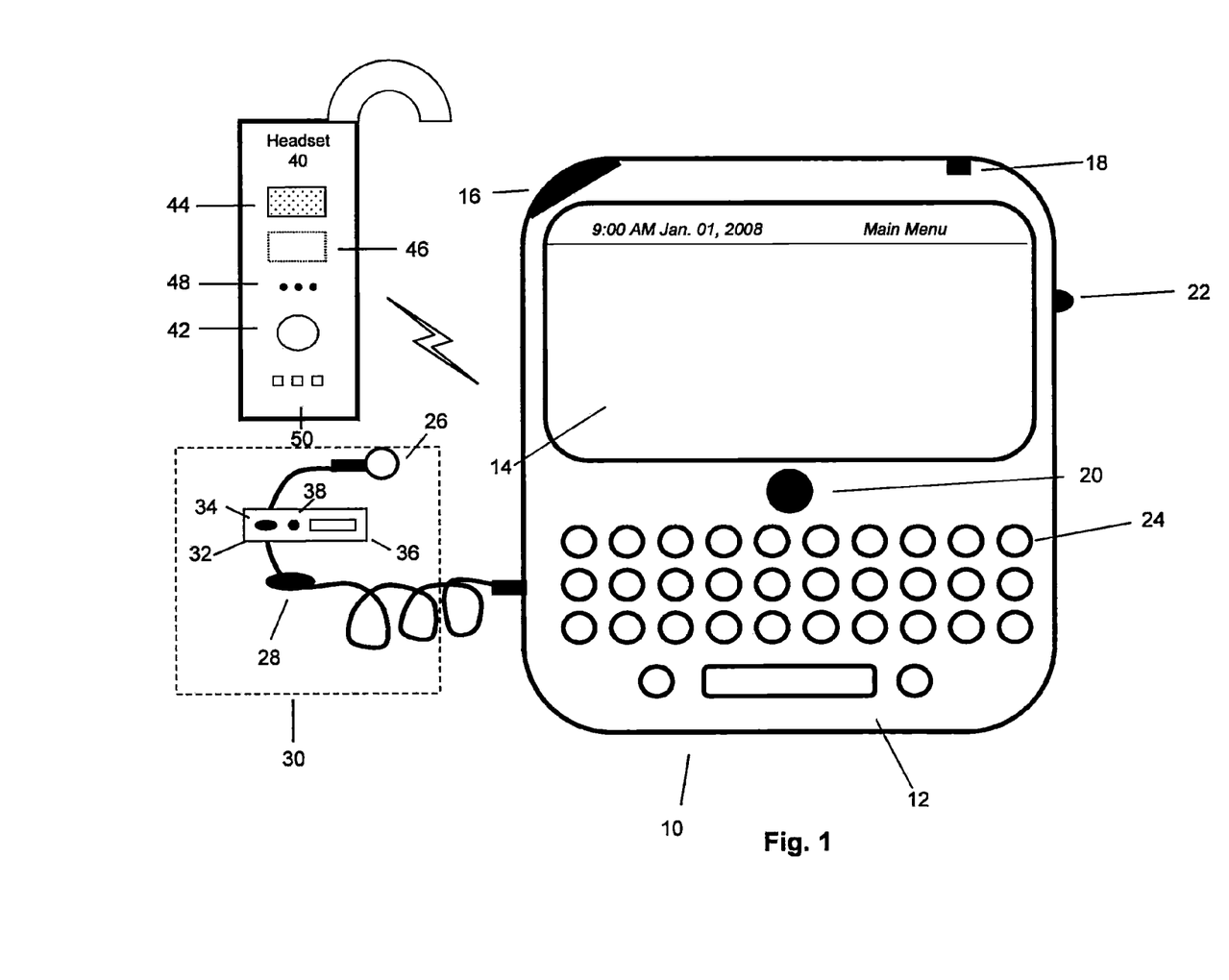
FIG. 1 is a schematic representation of a portable electronic device in communication with a wireless headset in accordance with an embodiment.

FIG. 1 provides a snapshot of typical elements associated with an embodiment. Therein, general features of a portable, electronic device are shown generally at 10. Device 10 is based on a computing platform having functionality of an enhanced personal digital assistant with a cellphone and can receive and transmit wireless communications, such as email, SMS and voice communications. Electronic device 10 can be based on construction design and functionality of other electronic devices, such as smart telephones, desktop computers, pagers or laptops having telephony equipment. In an embodiment, electronic device 10 includes a housing 12, an LCD 14, speaker 16, an LED indicator 18, a trackball 20, an ESC ("escape") key 22, keypad 24, a wired telephone headset 30 comprised of an ear bud 26 and a microphone 28. Controller 32 may be incorporated into headset 30, where controller has one or more buttons 34 that, when activated, send commands to device 10. Controller 32 may also have a display 36 and or LEDs 38 which are selectively activated to indicate various statuses of device 10 or headset 30. Trackball 20 and ESC key 22 can be inwardly depressed along the path of arrow "A" as a means to provide additional input to device 10. It will be understood that housing 12 can be made from any suitable material as will occur to those of skill in the art and may be suitably formed to house and hold all components of device 10. Further detail on components of device 10 are provided below.

Device 10 is operable to conduct wireless telephone calls, using any known wireless phone system such as a Global System for Mobile Communications (GSM) system, Code Division Multiple Access (CDMA) system, CDMA 2000 system, Cellular Digital Packet Data (CDPD) system and Time Division Multiple Access (TDMA) system. Other wireless phone systems can include Bluetooth and the many forms of 802.11 wireless broadband, like 802.11a, 802.11b, 802.11g, etc. that support voice. Other embodiments include Voice over IP (VoIP) type streaming data communications that can simulate circuit-switched phone calls. Ear bud 26 can be used to listen to phone calls and other sound messages and microphone 28 can be used to speak into and input sound messages to device 10.

Device 10 may communicate with additional remote devices or accessories, such as wireless headset 40. Headset 40 has microphone 42 and speaker 44, providing an audible interface for voice communications and commands that are generated and passed between it and device 10. Headset 40 may also have a display 46 and/or LEDs 48 which are selectively activated to indicate various statuses of device 10 or headset 40. Input keys 50 are provided to allow a user to provide a specific input response to any query that is shown on display 46. Headset 40 may communicate with device 10 using wireless communication signals and wireless communication protocols known in the art, such as Bluetooth (trademark) or any 802.11 category transmission protocol. In some respects, headset 40 and headset 30 provide comparable capabilities, but for headset 40 being wireless and headset 30 being wired to device 10. Headset 40 may have a form to allow it to be held in an ear for hands-free use. Next, descriptions of elements within device 10 and headset 40 are provided, in order.

Figure 2:
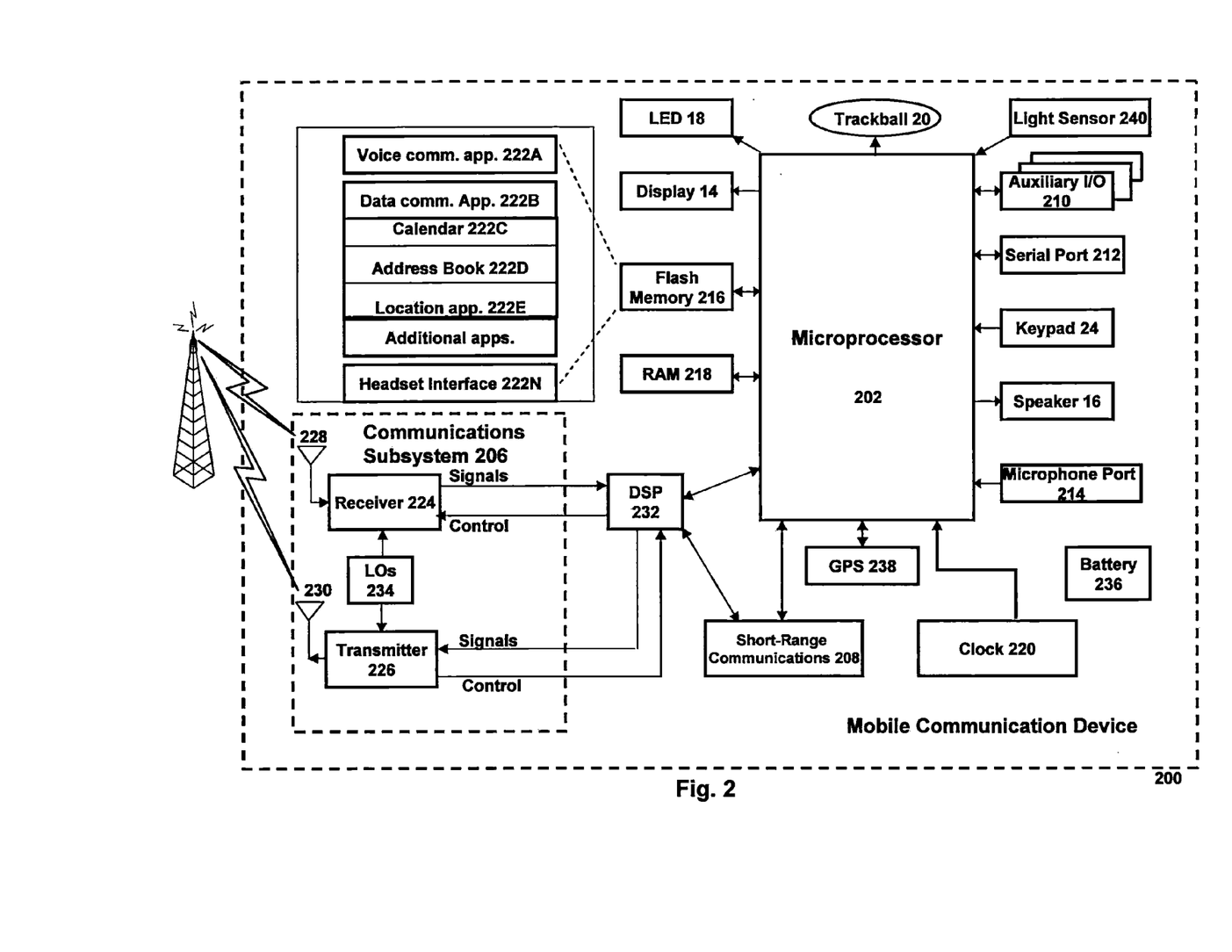
FIG. 2 is a block diagram of internal components of the device of FIG. 1.

Referring to FIG. 2, functional components of device 10 are provided in schematic 200. The functional components are generally electronic, structural or electro-mechanical devices. In particular, microprocessor 202 is provided to control and receive almost all data, transmissions, inputs and outputs related to device 10. Microprocessor 202 is shown schematically as coupled to keypad 24 and other internal devices. Microprocessor 202 preferably controls the overall operation of the device 10 and its components. Exemplary microprocessors for microprocessor 202 include microprocessors in the Data 950 (trade-mark) series, the 6200 series and the PXA900 series, all available at one time from Intel Corporation. Microprocessor 202 is connected to other elements in device 10 through a series of electrical connections to its various input and output pins. Microprocessor 202 has an IRQ input line which allows it to receive signals from various devices. Appropriate interrupt firmware is provided which receives and reacts to the signals detected on the IRQ line.

In addition to the microprocessor 202, other internal devices of the device 10 are shown schematically in FIG. 2. These include: display 14; speaker 16; keypad 24; communication sub-system 206; short-range communication sub-system 208; auxiliary I/O devices 210; (serial) port 212; microphone port 214 for microphone 28; flash memory 216 (which provides persistent storage of data); random access memory (RAM) 218; clock 220 and other device sub-systems (not shown). Controller 32 may connect to device 10 through port 212. Additional connections for microphone 28 may be routed to microphone port 214. Device 10 is preferably a two-way radio frequency (RF) communication device having voice and data communication capabilities. In addition, device 10 preferably has the capability to communicate with other computer systems via the Internet.

Operating system software executed by the microprocessor 202 is preferably stored in a computer-readable medium, such as flash memory 216, but may be stored in other types of memory devices, such as read-only memory (ROM) or similar storage element. In addition, system software, specific device applications, or parts thereof, may be temporarily loaded into a volatile store, such as RAM 218. Communication signals received by the mobile device may also be stored to RAM 218.

Additional memory storage may be provided, including persistent memory storage (not shown) or flash memory (not shown), which may be associated with microprocessor 202, or other components in device 10. Persistent memory may be a separate memory system to flash memory 216 and may be incorporated into a device, such as in microprocessor 202. Additionally or alternatively, persistent memory may be removable from device 10 (e.g. such as a SD memory card), whereas flash memory 216 may be permanently connected to device 10.

Microprocessor 202, in addition to its operating system functions, enables execution of software applications on device 10. A set of software (or firmware) applications, generally identified as applications 222, that control basic device operations, such as voice communication application 222A and data communication application 222B, may be installed on the device 10 during manufacture or downloaded thereafter. As well, software applications, such as calendar application 222C, address book 222D and location application 222E. Headset interface application 222N can process commands, data and messages that are sent between headset 40 and device 10. Additional applications such as personal information manager (PIM) application may be provided. Any application may be installed during manufacture or downloaded thereafter into device 10. Data associated with each application can be stored in flash memory 216.

Communication functions, including data and voice communications, are performed through the communication sub-system 206 and the short-range communication sub-system 208. Collectively, sub-systems 206 and 208 provide the signal-level interface for all communication technologies processed by device 10. Various applications 222 provide the operational controls to further process and log the communications. Communication sub-system 206 includes receiver 224, transmitter 226 and one or more antennas, illustrated as receive antenna 228 and transmit antenna 230. In addition, communication sub-system 206 also includes processing modules, such as local oscillators (LOs) 234. The specific design and implementation of communication sub-system 206 is dependent upon the communication network in which device 10 is intended to operate. For example, communication sub-system 206 of device 10 may operate with the Mobitex (trade-mark), DataTAC (trade-mark) or General Packet Radio Service (GPRS) mobile data communication networks and also operate with any of a variety of voice communication networks, such as Advanced Mobile Phone Service (AMPS), Time Division Multiple Access (TDMA), Code Division Multiple Access (CDMA), CDMA 2000, Personal Communication Service (PCS), Global System for Mobile Communication (GSM), etc. Other types of data and voice (telephonic) networks, both separate and integrated, may also be utilized with device 10. In any event, communication sub-system 206 provides device 10 with the capability of communicating with other devices using various communication technologies, including instant messaging (IM) systems, text messaging (TM) systems and short message service (SMS) systems.

Digital signed processor (DSP) 232 may be provided to assist in processing raw digital signals and commands from microprocessor 202 to sub-system 206. In addition to processing communication signals, DSP 232 provides control of receiver 224 and transmitter 226. For example, gains applied to communication signals in receiver 224 and transmitter 226 may be adaptively controlled through automatic gain-control algorithms implemented in DSP 232.

In a data communication mode, a received signal, such as a text message, Web page download or command from headset 40, is processed by the communication sub-system 206 and is provided as an input to microprocessor 202. The received signal is then further processed by microprocessor 202 which can then generate an output to display 14 or to an auxiliary I/O device 210. A device user may also compose data items, such as e-mail messages, using keypad 24, trackball 20 and/or some other auxiliary I/O device 210, such as a touchpad, a rocker switch, a trackball or some other input device. The composed data items may then be transmitted over communication network 140 via communication sub-system 206. Sub-system 206 may also detect when it is out of communication range for its remote systems.

In a voice communication mode, overall operation of device 10 is substantially similar to the data communication mode, except that received signals are output to speaker 16, and signals for transmission are generated by microphone 28. Alternative voice or audio I/O sub-systems, such as a voice message recording sub-system, may also be implemented on device 10. In addition, display 14 may also be utilized in voice communication mode, for example, to display the identity of a calling party, the duration of a voice call, or other voice call-related information.

Short-range communication sub-system 208 enables communication between device 10 and other proximate systems or devices, which need not necessarily be similar devices. For example, the short-range communication sub-system may include an infrared device and associated circuits and components, or a Bluetooth (trade-mark) communication module to provide for communication with similarly enabled systems and devices. Short range communication system 208 may be used as the signal communication interface between device 10 and headset 40. DSP 232 may process some of the commands and signals destined for headset 40 transmitted through short-range system 208. In such an arrangement, headset interface 222N may have procedures that control aspects of operation of module 208.

Powering the entire electronics of the mobile handheld communication device is power source 236. In one embodiment, power source 236 includes one or more batteries. In another embodiment, power source 236 is a single battery pack, especially a rechargeable battery pack. A power switch (not shown) provides an "on/off" switch for device 10. A power source interface (not shown) may be provided in hardware, firmware, software or a combination of such elements to selectively control access of components in device 10 to power source 236. Upon activation of the power switch an application 222 is initiated to turn on device 10. Upon deactivation of the power switch, an application 222 is initiated to turn off device 10. Power to device 10 may also be controlled by other devices and by software applications 222.

Device 10 may also have global positioning system 238 to assist in identifying a present location of device 10 and may also have light sensor 240 to provide data on the ambient light conditions for device 10. These elements may be controlled by software operating on device 10 as described earlier.

Figure 3:
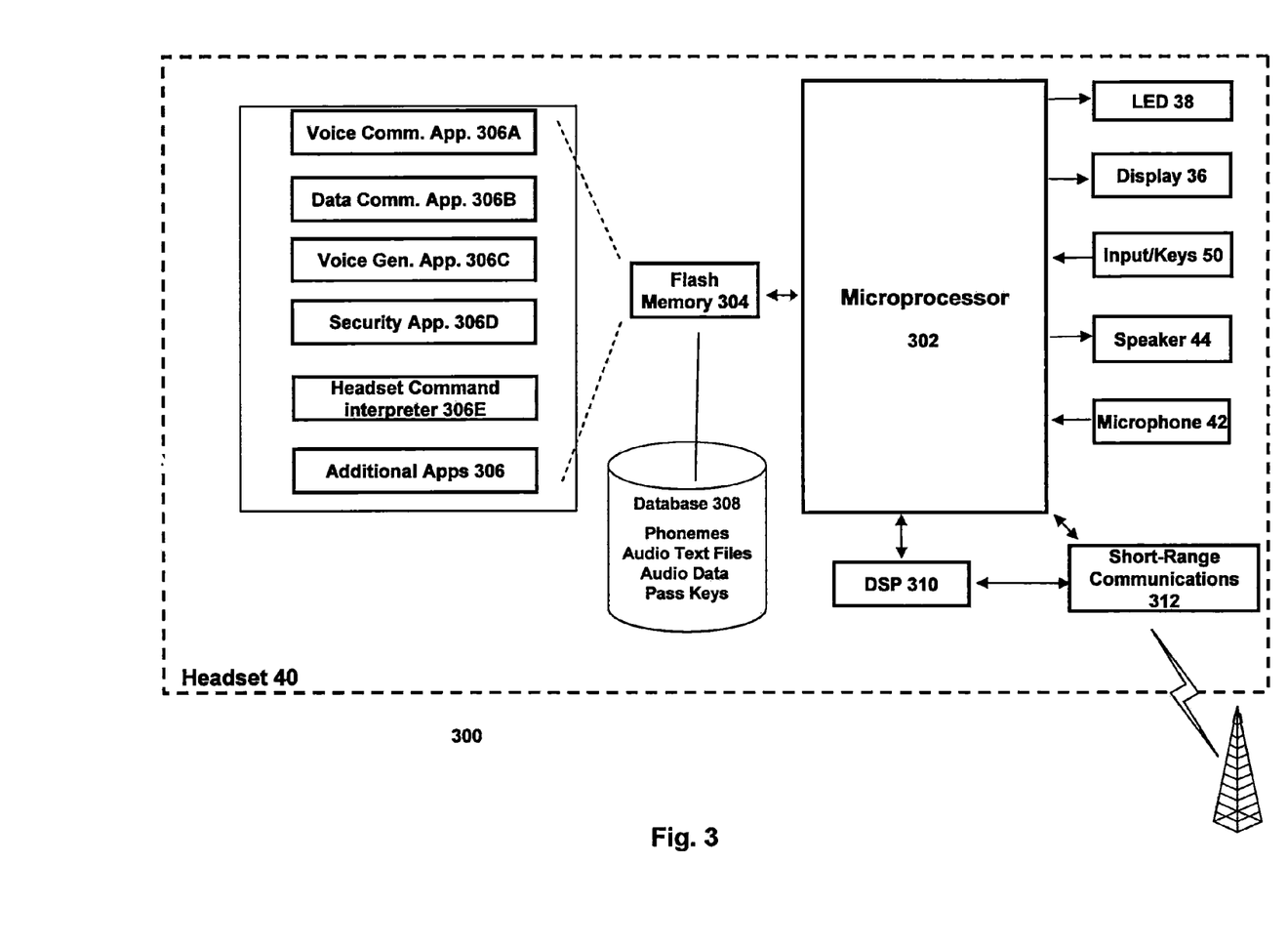
FIG. 3 is a block diagram of internal components of the headset in FIG. 1.

Referring to FIG. 3, further detail is provided on elements of headset 40, as shown in schematic 300. The functional components of headset 40 may share similarity to comparable components in device 10. In particular, microprocessor 302 is provided to control and receive almost all data, transmissions, inputs and outputs related to headset 40. Microprocessor 302 is shown schematically as coupled to input button(s) 34, memory 304 and other internal devices. Microprocessor 302 preferably controls the overall operation of headset 40 and its components. Microprocessor 302 is connected to other elements in headset 40 through a series of electrical connections to its various input and output pins. Microprocessor 302 has an IRQ input line which allows it to receive signals from various devices. Appropriate interrupt firmware is provided which receives and reacts to the signals detected on the IRQ line. In one embodiment, one or more components may be embedded in one single chipset, for example in an embedded chipset in the series of Blue Core series (trade-mark) offered by Cambridge Silicon Radio plc.

Microprocessor 302, in addition to its operating system functions, enables execution of software applications on headset 40. A set of software (or firmware) applications, generally identified as applications 306, that control specific functions of headset 40. Voice communication application 306A provides control over generation and transmission of typical audible signals between headset 40 and device 10, including processing of signals for speaker 44 and from microphone 42. Data communications application 306B processes data transmission and processing of command-level data and commands between device 10 and headset 40. Voice generation application 306C generates computerized speech for output through speaker 44. The text for the speech may be generated by an application 306 or may be provided as data to headset 40 through data communication application 306B from device 10. Security key application 306D provides tracking and generation of encryption keys, such as RSA keys. The keys are tracked automatically by the application 306D and are selectively provided to the user either visually through display 36 or audibly through generation of equivalent audible phonemes and by voice generation application 306C and subsequent conversion into an analog signal through DSP 310 and output through speaker 44 and data communication application 306B, may be installed on headset 40 during manufacture or downloaded thereafter. Headset command interpreter 306E is processes commands or messages intended for device 10 generated by headset 40 and related messages or signals received from device 10. Any application may be installed during manufacture or downloaded thereafter into headset 40. Data associated with each application can be stored in a database embodied in flash memory 304.

Database 308 is provided in memory 304 and stores accessible files providing input and output data for applications 306, including phoneme data, "canned" audio text files, audio data, Braille code tables, Morse code tables, signals and other information.

DSP 310 provides additional computational facilities to generate and process voice-related inputs and outputs for processes 306. DSP 310 may also be used to reduce noise or other sound artefacts in signals received by microphone 42 or other input devices and to process the signals to attempt to isolate a user's voice from the background/ambient aural signal in the input signals.

Short-range communication sub-system 312 enables communication between headset 40 and device 10. For example, the short-range communication sub-system may include an infrared device and associated circuits and components, or a Bluetooth (trade-mark) communication application to provide for communication with similarly enabled systems and devices.

It will be appreciated that with the components described for headset 40 and device 10, a voice-based interface can be provided between the two. Following is more detail on aspects of an interface according to an embodiment.

One feature of an interface according to an embodiment provides an authentication process between a particular headset 40 for a particular device 10. Authentication may be done using generally known techniques, including utilizing a secured pair association between the two. One implementation provides that headset 40 stores and or selectively generates a set of pass keys, one of which needs to be provided to device 10 during an authentication session. The pass key value may change at regular intervals, similar to authentication codes used in a virtual private network (VPN) through a dongle.

One authentication process utilizes a 256 bit Advanced Encryption Standard (AES) to generate and manage processing of pass keys. Other standards may be used. For an embodiment, the pass key value is locally generated on headset 40 and is presented to the user through an output on headset 40 (e.g. through speaker 44 or display 36). The user is expected to read or extract the provided key value and the provide it himself to device 10. With this key passing mechanism among headset 40, the user and device 10, the pass key is provided outside of a transmission band to device 10. However, other embodiments may have headset 40 electronically encrypt and transmit a key to device 10. In some instances, authentication may be initiated at device 10.

When device 10 receives the pass key value as entered by the user, the overall authentication process expects device 10 to activate its key comparison procedure (which may be incorporated into headset interface process 222N). The comparison procedure compare the value of the entered key against an expected value of a key and if a match is found, headset 40 is deemed to be authenticated to device 10. Device 10 may then send a message confirming authentication to headset 40 and establish necessary communication channels.

Headset 40 may be configured to be able to communicate with more than one electronic device, including at least device 10. It may store attributes for connection parameters with its known devices in database 308. One features provided in headset 40 is a GUI or message that allows its user to select which device with which headset 40 is to communicate. Headset 40 may have a process to scans database 308 to identify a list of electronic devices with which it can communicate. Next, a list of the electronic devices is generated on the display of headset 40 and a prompt (either in the GUI or through an audible message or through any predetermined indicator) is generated on headset 40 to the user, to invite him to identify a target electronic device of from the list. When the user provides a response identifying a target device to the invitation (for example, either through an audible command spoken into the microphone of headset 40 that is interpreted by headset 40 or by activation of a preset response key on headset 40), the response is analyzed by headset 40. When the identification provides a match to an electronic device, an authentication process for the target electronic device can be initiated.

Figure 4:
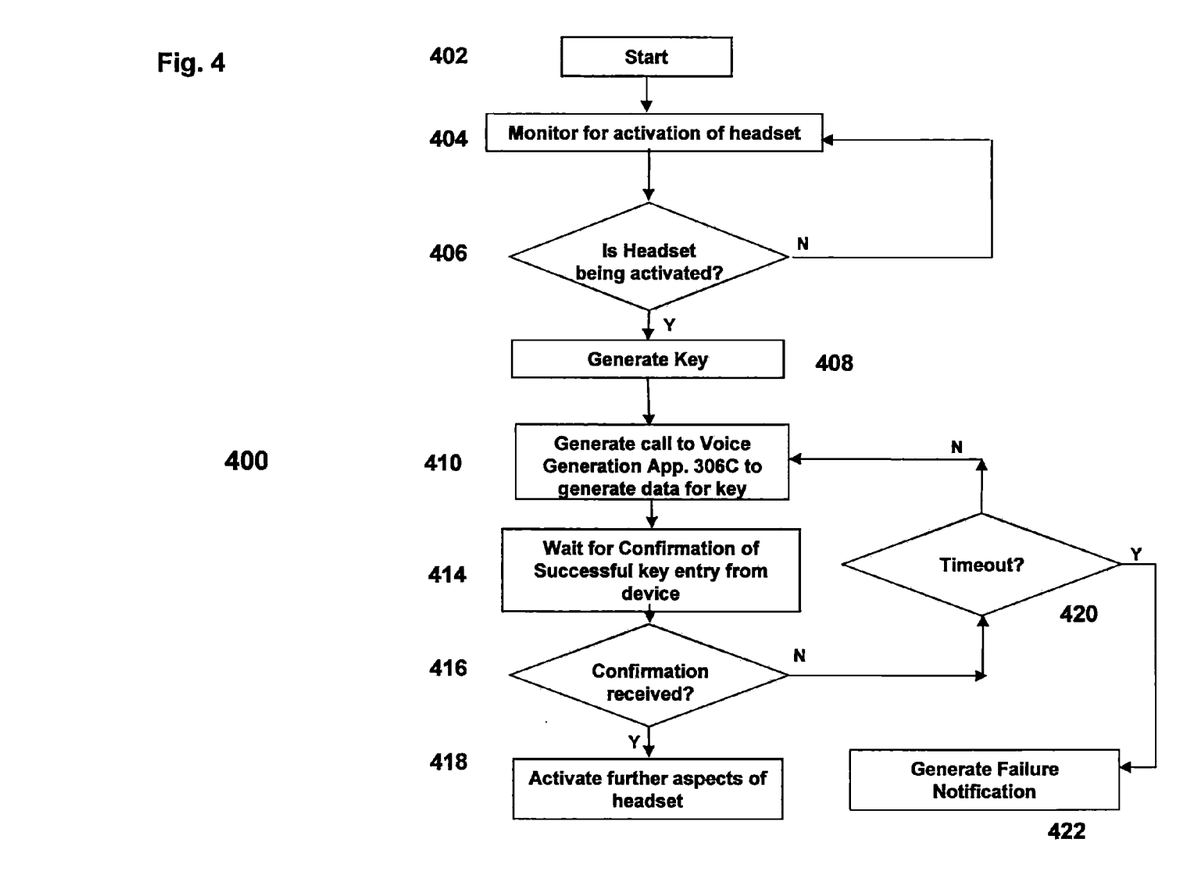
FIG. 4 is a flowchart of exemplary steps executed by the embodiment of FIG. 1 in processing communications and commands between the device and the headset.

Referring to FIG. 4, an exemplary authentication process between headset 40 and device 10 is shown. Headset 40 may execute its portions of the authentication process as procedures in security application 306D. After the start of the authentication routine in security application 306D, the process enters a loop between steps 402 and 404 where headset 40 waits for activation of the authentication process. This may be effected by activation of a predetermined key 50 on headset 40. In the loop, at step 404, the key 50 is monitored for activation. At step 406, a test is made by scanning the inputs of keys 50 to see whether the predetermined key 50 has been activated. If not, then application 306D loops back to step 404. It will be appreciated that this loop may be skipped or may be incorporated with the start process 402.

In use, after user of headset 40 activates the predetermined key 50, headset 40 may enter a "pairing" mode. Headset 40 may contain a data in database 308 identifying a set of devices, such as device 10, that it can be paired with. Application 306D may access the data and present connection options to the user through display 46. Such connection options include: initiating a connection request now, deferring a connection request, selecting a different device for a connection request, and others.

In an alternative embodiment, the pairing mode may be entered first and the pass key authentication process described above may be executed during the pairing process.

If the user wishes to make a connection request immediately, as part of application 306D, headset 40 may generate an output providing an announcement for the user. The announcement may be provided as a pre-recorded announcement generated through speaker 44, such as "Would you like to pair now?". Alternatively or additionally a comparable text message may be generated on display 36 or an indicator light having such a prescribed meaning is activated.

In another embodiment, the above noted steps may be executed in a different order. For example, an announcement as described herein may be a first step executed during a pairing process, followed by the devices entering a pairing mode, followed by a process to authenticate headset 40 with device 10, as described above.

Once headset 40 has been correctly activated and the pairing mode has been selected, application 306D proceeds to step 408 where a secure key is generated. The value of the pass key will depend on the selected authentication and encryption protocols that have been determined to be used by headset 40 and device 10. The generated key will be a string of alphanumeric characters, based on randomizing factors used by the encryption protocol. The key (and any data required to generate same) may be stored in flash memory 304. Application 306D may automatically change the pass key value after a predetermined period of time, for example once every 60 seconds.

At step 410 security application 306D accesses voice generation application 306C to generate the audible phonemes of the generated key. The string of alphanumeric characters is provided as data from security application 306D to voice generation application 306C. Voice generation application 306C then creates a speech output destined to be sent out as a voiced message through speaker 44. The speech may include a predetermined audible phrase (for example "The key is . . . ") which has a vocalization of the generated key appended to it. In this example, if the key is "09A4", voice generation application 306C create data to generate the speech "The key is 09A4". The speech may be provided in multiple languages. This data is provided to DSP 310 which then to convert syllables in the text to an equivalent audible phoneme for output through speaker 44. The data may go directly from DSP 310 to speaker 44 or the data may go from DSP 310 through microprocessor 302 to speaker 44. The user is expected to listen for the vocalized key through speaker 44 then enter it into device 10. Alternatively or additionally, the string may be displayed on display 36. Additionally or alternatively, a coded audible signal (such as Morse code) and/or a coded display signal (such as a visual Morse code or Braille) may be generated through a light on the device.

Meanwhile, device 10 is waiting for input to attempt to authenticate headset 40. This waiting mode may be entered via receipt of an "entering" signal from headset 40. The "entering" signal may be generated by security application 306D and transmitted in-band to device 10 through short-range communications module 308. Once a key value is entered on device 10, the authentication software on device 10 (which may be provided as part of headset interface application 222N) evaluates the entered key against an expected key, whose value is generated locally on device 10. The value of the expected key, its generation and its updating parameters comply with the authentication protocol(s) used by, and coordinated between, device 10 and headset 40. If the entered key matches the expected key, then headset 40 is authenticated. At such time, device 10 may generate and send a "verified" signal to headset 40. The message may be provided as an in-band message.

Meanwhile, as device 10 is waiting for entry of the key value and is processing the key value, headset 40 is placed in a waiting loop for receipt of any timely response message from device 10. As part of the loop, at step 416, security application 306D waits for to see whether confirmation of the successful entry of the key has been received by device 10. If the key has been successfully received, then application 306D proceeds to step 418 as authentication and verification is complete and both headset 40 and device 10 can activate necessary processes allowing them to communicate with each other. If no confirmation has been received, then application 306D proceeds to step 420 where a test is made to see whether wait time has timed out. If no time out has occurred, then application 306D returns to step 414. If a time out has occurred then application 306D moves to step 422 to signal that an error condition has occurred. In other embodiments the timeout test may be skipped, amended or replaced with a different test.

In an embodiment, a verification process may be executed for the remote device (headset) to verify the code sent by the handheld to have both devices authenticated with each other.

Another feature of an embodiment enables headset 40 to be an interface to initiate additional commands and status requests to device 10. Such commands and requests may be made as an audible, voice instruction by the user spoken into microphone 42. Additionally or alternatively a set of input keys 50 may be dedicated to activate a specific command or status request.

Once a command is entered on headset 40, it is processed by headset command interpreter 306E and is converted into an appropriate message or signal that is sent to device 10. The message may be sent either as an in-band signal to device 10. For other embodiments, it will be appreciated that other processes or elements in headset 40 may process the command.

Commands initiated on headset 40 may request data and status information from device 10. The scope of commands is wide. Exemplary commands include requests for data relating to: battery capacity of device 10, signal strength of communication signals received at device 10 and details regarding the last telephone call made to or from device 10. The call details may include the number of the last call and/or its duration, battery capacity of headset 40, time of day, and others.

Other commands initiated on headset 40 may request specific actions to be initiated at device 10. Again, the scope of commands is wide. Exemplary commands include requests for data relating to: redialing a number, initiating a call to a specific number and activating a particular application on device 10 (e.g. the calendar function).

As a general handshaking protocol between device 10 and headset 40, once a command for device 10 has been initiated on headset 40, receipt of one or more command signals or messages from headset 40 may initiate a separate command processing procedure in device 10. Such commands may be received and processed by code provided in headset interface 222N. Headset interface may activate internal status procedures to extract data relating to the received command and then create and send an appropriate response message or signal from device 10 to headset 40 (or other devices).

Also, an embodiment enables an application operating on device 10 to obtain data from headset 40 and use that data as additional data for that application. The data may be provided from a selection choice associated with a key 50 on headset 40 or may be provided as vocalized data spoken by a user into microphone 42.

For example, an account billing application operating on device 10 may have a call tracking routine that appends time and calling information data to a call record associated with a (cellular/telephonic/voice) communication session being processed by device 10. As part of an embodiment, some of the data may be provided from headset 40. Headset command interpreter 306E may be prompted by a message received from device 10 to generate a list of options on display 36 relevant to a currently executing application operating on device 10. Messages sent between device 10 and headset 40 may indicate the start of a call session, the end of a call session and other data. Processes operating on headset 40 may then process the data provided in the message, generate new data (e.g. call duration) and generate and transmit messages containing same to device 10.

For example, if a telephone call has just completed, voice communication application 222A (on device 10) may have an accounting module to collect additional data related to the call. As such, application 222A may initiate a message sent to headset 40 to retrieve specific information from the user. In response, headset command interpreter 306E may generate a query to the user, which is displayed on display 36, such as: "Do you wish to track the call Yes/No? (Select key)". The user is prompted to activate keys 50 associated with the "Yes" and "No" choices. If the "Yes" key is activated then headset 40 may prompt the user to speak or enter an appropriate billing code for the call. The data is then provided to device 10 for incorporation with other tracking data associated with the call. It will be appreciated that if the user speaks the billing code into microphone 42, DSP 310 and Headset command interpreter 306E have processes to convert the spoken text into data, such as ASCII data or a voice file, that can be used by the receiving application on device 10.

It will be appreciated that the applications and modules operating on headset 40 and device 10 and other applications in the embodiments can be implemented using known programming techniques, languages and algorithms. The titles of the applications are provided as a convenience to provide labels and assign functions to certain applications. It is not required that each application perform only its functions as described above. As such, specific functionalities for each application may be moved between applications or separated into different applications. Different signalling techniques may be used to communicate information between applications using known programming techniques. Known data storage, access and update algorithms allow data to be shared between applications. For example, detection or completion of an event described in FIG. 3 may cause an interrupt to be generated on microprocessor 302 and a particular interrupt routine may be provided to process the event. It will further be appreciated that other applications and systems on headset 40 or device 10 may be executing concurrently with other local software. As such, specific code may be structured to operate in as a "background" application on headset 40 and device 10, using programming techniques known in the art.

It will further be appreciated that while an embodiment relating to headset 40 has been described where headset 40 communicates over a wireless channel with device 10, in another embodiment, wired headset 30 may be provided with comparable applications and functions as described for headset 40.

As used herein, the wording "and/or" is intended to represent an inclusive-or. That is, "X and/or Y" is intended to mean X or Y or both.

In this disclosure, where a dimension is provided as an approximate value (for example, when the dimension is qualified with the word "about"), a range of values will be understood to be valid for that dimension. For example, for a dimension stated as an approximate value, a range of about 20% larger and 20% smaller than the stated value may be used. Dimensions of features are illustrative of embodiments and are not limiting unless noted.

The present disclosure is defined by the claims appended hereto, with the foregoing description being merely illustrative of embodiments. Those of ordinary skill may envisage certain modifications to the foregoing embodiments which, although not explicitly discussed herein, do not depart from the scope of the disclosure, as defined by the appended claims.

The invention claimed is:

1. A method for associating a remote device with an electronic device, comprising:
    at said remote device scanning a database to identify a list of electronic devices with which said remote device can communicate;
    generating said list of electronic devices on a display of said remote device;
    generating a prompt on said remote device for a user of said remote device to identify a target electronic device of said electronic devices;
    upon receiving an input identifying said target electronic device from said user, generating a pass key for an authentication process for said target electronic device on said remote device;
    providing said pass key to said user through an output device on said remote device;
    waiting for said user to provide said pass key to said target electronic device; and
    if said remote device receives a timely message from said target electronic device indicating that said remote device has been authenticated via said pass key,
        activating an application on said remote device that allows said remote device to further communicate with said target electronic device;
        tracking call duration data associated with a voice communication session being handled by said target electronic device;
        receiving account data associated with said voice communication session; and
        transmitting said call duration data and said account data to said target electronic device upon receipt of a request for said call duration data from said target electronic device.

2. The method for associating a remote device with an electronic device as claimed in claim 1, wherein said remote device provides a speaker and a microphone to provide audible communication with said user.

3. The method for associating a remote device with an electronic device as claimed in claim 2, wherein said remote device generates an audio output on said speaker providing said pass key to said user.

4. The method for associating a remote device with an electronic device as claimed in claim 3, further comprising:
receiving at said remote device vocalized information for said target electronic device from said user through said microphone;
processing said vocalized information to identify an underlying command for said target electronic device; and
generating a message to said target electronic device relating to said underlying command.

5. The method for associating a remote device with an electronic device as claimed in claim 4, wherein said vocalized information relates to data that is used by an application operating on said target electronic device.

6. The method for associating a remote device with an electronic device as claimed in claim 2, wherein said remote device provides said pass key to said user in an out-of-band transmission mode.

7. The method for associating a remote device with an electronic device as claimed in claim 1, further comprising:
if said remote device does not receive said timely message from said target electronic device indicating that said remote device has been authenticated, not activating said application on said remote device.

8. The method for associating a remote device with an electronic device as claimed in claim 1, further comprising:
generating data on said remote device and providing said data to said target electronic device for use by a second application operating on said target electronic device.

9. A remote device for use with an electronic device, comprising:
a speaker;
a display;
a microphone;
a microprocessor;
a database containing a list of electronic devices with which said remote device can communicate;
a device selection process providing instructions to said microprocessor to:
access said list;
generate on said display aspects of said list;
generate a prompt for a user of said remote device to identify a target electronic device from said list; and
initiate an authentication process for said target electronic device upon receiving an appropriate reply from said user;
said authentication process providing instructions to said microprocessor to:
authenticate said remote device to said target electronic device;
generate a pass key according to an authentication protocol that is followed by said remote device;
an accounting process providing instructions to said microprocessor to:
track call duration data associated with a voice communication session being handled by said target electronic device;
receive account data associated with said voice communication session; and
transmit said call duration data and said account data to said target electronic device upon receipt of a request for said call duration data from said target electronic device, and
a voice generation process providing instructions to said microprocessor to convert data relating to said pass key into a voice format for output on said speaker,
wherein if said remote device receives a timely message from said target electronic device indicating that said remote device has been authenticated, said remote device is activated to allow said remote device to further communicate with said target electronic device.

10. The remote device for use with an electronic device as claimed in claim 9, wherein said remote device generates an audio output on said speaker providing said pass key to a user of said remote device.

11. The remote device for use with an electronic device as claimed in claim 10, further comprising a voice processing application that:
receives vocalized information for said device from said user through said microphone;
processes said vocalized information to identify an underlying command for said target electronic device; and
generates a message to said device relating to said underlying command.

12. The remote device for use with an electronic device as claimed in claim 11, wherein said vocalized information relates to data that is used by an application operating on said target electronic device.

13. The remote device for use with an electronic device as claimed in claim 9, wherein said remote device provides said pass key to said user in an out-of-band transmission mode.

14. The remote device for use with an electronic device as claimed in claim 9, wherein said remote device generates and sends a message to said target electronic device indicating that said remote device is processing said pass key.

15. The remote device for use with an electronic device as claimed in claim 14, wherein said message is sent in an in-band communication to said target electronic device.

16. The remote device for use with an electronic device as claimed in claim 9, wherein said remote device:
requests data relating to said target electronic device relating to any one of a battery capacity of said target electronic device and signal strength of communication signals received at said target electronic device; and
generates on said display information relating to said data.

* * * * *